(12) United States Patent  (10) Patent No.: US 7,573,498 B1
Dhanoa et al.  (45) Date of Patent: Aug. 11, 2009

(54) SYSTEM AND METHOD FOR PROVIDING VIDEO CONFERENCING SERVICES TO A TELEVISION-SERVICE SUBSCRIBER

(75) Inventors: Shingara Singh Dhanoa, Overland Park, KS (US); Ezzat Suleiman Atieh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 790 days.

(21) Appl. No.: 11/001,472

(22) Filed: Dec. 1, 2004

(51) Int. Cl.
  *H04N 7/14* (2006.01)
(52) U.S. Cl. .................. 348/14.04; 348/14.08
(58) Field of Classification Search .............. 348/14.04, 348/14.08, 14.09; 370/260, 261; 725/105, 725/106
  See application file for complete search history.

(56) References Cited

U.S. PATENT DOCUMENTS

| | | | | |
|---|---|---|---|---|
| 5,790,180 A | * | 8/1998 | Wild | 348/14.04 |
| 5,796,424 A | * | 8/1998 | Ely et al. | 348/14.1 |
| 7,046,637 B2 | * | 5/2006 | Roy | 348/14.08 |
| 2002/0073430 A1 | * | 6/2002 | Crandall et al. | 725/105 |
| 2002/0199181 A1 | * | 12/2002 | Allen | 348/14.01 |
| 2003/0021238 A1 | * | 1/2003 | Corneliussen et al. | 370/260 |
| 2004/0246332 A1 | * | 12/2004 | Crouch | 348/14.08 |
| 2005/0058088 A1 | * | 3/2005 | Decker et al. | 370/260 |
| 2006/0087553 A1 | * | 4/2006 | Kenoyer et al. | 348/14.08 |
| 2007/0126856 A1 | * | 6/2007 | Rodriguez et al. | 348/14.01 |

* cited by examiner

*Primary Examiner*—Stella L Woo (57) ABSTRACT

A system and methods are described for providing video conferencing services to a television-service subscriber via a television host device and a television-service-provider network. A request to participate in a video-communication session is sent from a television host device to a network entity. Based on the request, the network entity establishes a video-communication session between the television host device and at least one video-communication endpoint.

40 Claims, 3 Drawing Sheets

SYSTEM AND METHOD FOR PROVIDING VIDEO CONFERENCING SERVICES TO A TELEVISION-SERVICE SUBSCRIBER

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of providing video conferencing services to television-service subscribers.

BACKGROUND OF THE INVENTION

People often wish to communicate face-to-face with others who are located remotely from them. For example, employees may wish to work from home but may need to communicate visually with their coworkers and employer. A business in Washington may wish to meet with clients in Florida without incurring the expenses and time related to traveling. A student in Maine may wish to take courses and attend classes offered by a university in California without having to move there. Researchers scattered across the country may wish to collaborate on a common project. A myriad of other examples abound that relate to benefits associated with being able to communicate both visually and audibly from remote locations.

It would be desirable to provide video-conferencing functionality via television sets or similar devices (HDTV monitors, flat-panel displays, etc.) without the need for equipment dedicated to such services. Many people have set-top boxes that source content to a television set. The current state of the art could be advanced by providing video conferencing services to television devices through host devices, such as set-top boxes.

SUMMARY OF THE INVENTION

In some embodiments, the present invention provides a system, methods, and computer-readable media for providing video conferencing services to a television-service subscriber via a television host device and a television-service-provider network. The television host device could be a set-top box, a cable-ready television, or any other device that is capable of transmitting and receiving data via the television-service-provider network.

Thus, in one aspect, an exemplary embodiment of the invention is a method for enabling a television-service subscriber to participate in a video-communication session. In accordance with the method, a television host device receives a command to participate in a video-communication session. Based on the command, the television host device sends a request through a television-service-provider network to a network entity. The request causes the network entity to establish a video-communication session between the television host device and at least one video-communication endpoint, such as a videophone.

Another exemplary embodiment of the invention is a method for establishing a video-communication session. Requests to participate in a video-communication session are received from a number of video-communication endpoints. At least one of the video-communication endpoints is a television host device communicating through a television-service-provider network. Based on the requests, a video-communication session is established among the video-communication endpoints.

In another aspect of the invention, an exemplary embodiment takes the form of one or more computer-readable media having computer-useable instructions embodied thereon for performing a method comprising: receiving a command in a television host device to participate in a video-communication session; and based on the command, transmitting a request through a television-service-provider network to a network entity, wherein the request includes a unique code for routing the request and the request causes the network entity to establish a video-communication session between the television host device and at least one video-communication endpoint.

Yet another exemplary embodiment of the invention takes the form of one or more computer readable media having computer-useable instructions embodied thereon for performing a method comprising: receiving a request from a number of video-communication endpoints to participate in a video-communication session, wherein each request includes a unique code for routing the request and at least one of the video-communication endpoints is a television host device communicating through a television-service-provider network; and based on the requests, establishing a video-communication session among the video-communication endpoints.

In another aspect, an exemplary embodiment of the invention is a system to enable a television host device to participate in a video-communication session. The system includes a packet-switched network, a television host device, a call manager, and a video conferencing bridge. The television host device can transmit and receive data via the packet-switched network. The call manager, which is located on the packet-switched network, can route, from the television host device to the video conferencing bridge, a request to participate in a video-communication session. The video conferencing bridge, which is also located on the packet-switched network, can establish a video communication path between the television host device and at least one video-communication endpoint.

BRIEF DESCRIPTION OF THE SEVERAL VIEWS OF THE DRAWINGS

The present invention is described in detail below with reference to the attached drawing figures, which are incorporated by reference herein, and wherein.

DETAILED DESCRIPTION OF THE INVENTION

As previously mentioned, the present invention provides a system, methods and computer-readable media for providing video conferencing services to a television-service subscriber via a television host device and a television-service-provider network.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CMTS | Cable Modem Terminal Server |
| CTSP | Cable-Television-Service Provider |
| HFC | Hybrid Fiber Coaxial |
| IP | Internet Protocol |
| LAN | Local Area Network |
| MAC | Media Access Control |
| SBC | Session Border Controller |
| SIP | Session Initiation Protocol |
| STB | Set-Top Box |
| VCB | Video Conferencing Bridge |
| WAN | Wide Area Network |

Further, various technical terms are, used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media, such as acoustic, infrared, radio, microwave, spread-spectrum, and other wireless media technologies. Combinations of the above are included within the scope of computer-readable media.

Figure 1:
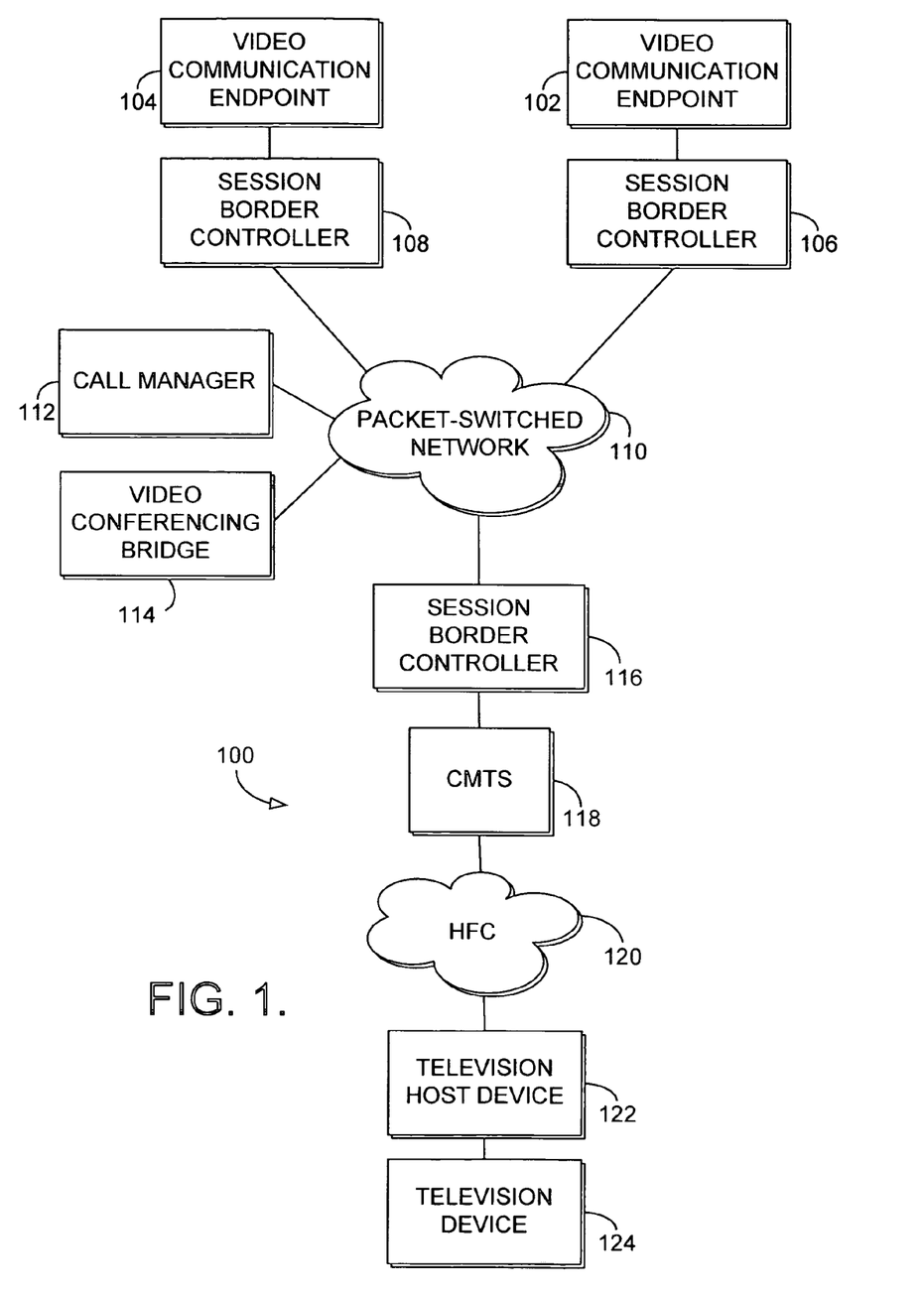
FIG. 1 is a simplified block diagram of an exemplary communications system, in which exemplary embodiments of the present invention may be employed.

Referring to the drawings, FIG. 1 is a simplified block diagram of an exemplary communications system, in which exemplary embodiments of the present invention may be employed. It should be understood that this and other arrangements described herein are set forth only as examples. Those skilled in the art will appreciate that other arrangements and elements (e.g., machines, interfaces, functions, orders, and groupings of functions, etc.) can be used instead, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, communications system 100 includes video-communication endpoints 102 and 104, session border controllers (SBC) 106 and 108, packet-switched network 110, call manager 112, video conferencing bridge (VCB) 114, SBC 116, headend/cable modem terminal server (CMTS) 118, hybrid fiber coaxial (HFC) network 120, television host device 122, and television device 124. Video-communication endpoints 102 and 104 each may be a videophone or any other type of device capable of receiving and transmitting audio and video data for communicating via a video conference session.

Television host device 122 may be a legacy box, a set-top box (STB) having an integrated cable modem, or an integrated terminal device, physically integral to, for example, a television. In general, television host device 122 may be any device arranged to receive analog and/or digital cable-television content, and which is capable of receiving and transmitting data via HFC network 120. Television device 124 could be a television set or any other device capable of presenting television and data content from television host device 122. The functionality of television host device 122 and television device 124 could be incorporated in one device.

With continuing reference to FIG. 1, communications system 100 provides a communication path among video-communication endpoint 102, video-communication endpoint 104, and television host device 122, including packet-switched network 110. Network 110 may include one or more wide area networks (WANs) and/or one or more local area networks (LANs), as well as one or more public networks, such as the Internet, and/or one or more private networks. Network 110 may include one or more networks operated by one or more television-service providers and video-conference-service providers. Packets may be routed in and among network 110 using protocols, such as the Internet Protocol (IP), and devices in communication within and among network 110 may be identified by a network address, such as an IP address.

Entities on network 110 are able to communicate with television host device 122, via a headend/CMTS 118. Cable-television content and other data may be transmitted from headend/CMTS 118 to television host device 122 using any suitable media, such as any combination of fiber optic and coaxial cable, making up HFC network 120. HFC network 120 may contain a number of fiber nodes (not shown), which enable the transition between the fiber-optic and coaxial-cable portions of the network. Any number of fiber nodes may be used to convert from (i) fiber signals (carried by fiber optic cable from headend/CMTS 118 to the fiber nodes) to (ii) RF signals (carried by coaxial cable from the fiber nodes to television host device 122).

The "headend" functionality of headend/CMTS 118 operates to amplify and modulate multiple video, audio, and data sources onto a number of channels, so that the content of these sources may be received by television host devices, such as television host device 122. Headend/CMTS 118 may be connected to these video, audio, and data sources via network 110, as well as any other networks, satellite connections, private connections, proprietary connections, and any other sources of television and/or data content.

The CMTS functionality of headend/CMTS 118 operates to transmit and receive packet data to and from cable modems via HFC network 120. If television host device 122 has an integrated cable modem, headend/CMTS 118 could engage in packet-data communication with television host device via HFC network 120. Headend/CMTS 118 thus acts as an interface between RF signals carrying packet data via HFC network 120 and IP signaling via network 110. The packet-data signaling between headend/CMTS 118 and cable modems via HFC network 120 may comply with "DOCSIS" (Data Over Cable Service Interface Specification) specifications, available from Cable Television Laboratories, Inc. of Louisville, Colo., which are incorporated herein by reference.

When a television host device, such as television host device 122, is provisioned for use, such as when a new customer signs up for cable-television service, the customer may place a telephone call to a cable-television-service provider (CTSP), during which the CTSP may create an account for the customer, and store in the account all necessary and then-available account information, such as the customer's name, street address, social security number, and billing information (such as credit card information), etc. Next, the CTSP may send a technician to install television host device 122 at the customer's residence. Television host device 122 will typically have a MAC (Media Access Control) address, which will typically be assigned to the device by the manufacturer, and will identify television host device 122 as a unique physical device. Following installation and ensuring that television host device 122 is properly functioning, the technician may record the MAC address of television host device 122 for association with the customer's account. The MAC address may be associated with the customer's account by some manner of data entry, which may be manual or automated, such as by the technician using a device to scan a bar code on the television host device and transmit the MAC address to network 110.

In operation, each time television host device 122 is powered on, it may transmit to network 110, via an out-of-band management channel, a registration/authentication message, which may contain the MAC address, as well as any other data uniquely identifying and authenticating television host device to network 110. The majority of cable providers use proprietary methods of registration and authentication specific to their particular head-end implementation(s) and television host device manufacturer(s); however, some standards are evolving, such as the Open Cable Application Protocol. Once television host device 122 has been registered and authenticated, network 110 may assign television host device 122 a network address for it to use until the next time it is booted up in one embodiment. It is to this network address that network 110 may transmit any data bound for television host device 122.

Network 110 may then associate television host device 122's MAC address with television host device 122's assigned network address. Through this association, the customer's account then has a unique subscriber-identifier (the MAC address of television host device 122) associated with a unique network address on network 110 (the assigned network address). Typically, this network address will be an IP address, and the CTSP will use IP routing to transmit cable-television content and other data to television host device 122. However, proprietary addressing schemes, such as a VPN (Virtual Private Network) created between the headend and television host device 122 each time television host device 122 is powered on, may be used as well.

Cable-television content may be transmitted to television host device 122 on 6-MHz-wide RF channels spanning frequencies greater than 54 MHz, while other communication, such as providing program guide information, performing software updates, fault monitoring, configuration, programming, accounting, and performance monitoring, may be conducted on an out-of-band management channel. The out-of-band channel may also be used by television host device to transmit information to network 110, such as registration and authentication messages, requests for program guide information, and pay-per-view ordering messages.

If a proprietary routing scheme (rather than IP routing) is used by the CTSP to route data to television host devices, television host device 122 may also use the out-of-band management channel to request an IP address and engage in IP communication. Because television host device 122 is registered and authenticated by network 110 each time television host device 122 is powered on, television host device 122 is authenticated on network 110 for the duration of the time that the power to television host device 122 remains on. During this time, therefore, television host device 122 may need no further authentication to gain IP connectivity, but may simply need to transmit to network 110, via the out-of-band management channel, a request for an IP address. An entity on network 110 may then assign television host device 122 an IP address. Television host device 122 may then use the assigned IP address to engage in IP communication with entities on network 110.

Television host device 122 may include a client for providing signaling capabilities for initiating video conference sessions. For example, television host device 122 may include a SIP (session initiation protocol) client to allow television host device to send and receive SIP messages to invoke a video conference session. SIP is a protocol useful for transmitting short messages between entities connected via one or more data networks, and is primarily used to set up, or initiate, media or communication sessions between entities. Alternatively, other types of signaling protocols, such as SS7 and H.323, may be used in connection with the present invention.

Television host device 122 is coupled to network 110 by SBC 116. In addition, video-communication endpoints 102 and 104 are coupled to network 110 by SBC 106 and 108, respectively. Each device may be coupled to network 110 by other means, such as a gateway. SBC 116 provides pass-through signaling capability between television host device 122 and call manager 112. Likewise, SBC 106 and 108 provide pass-through signaling capability between call manager 112 and video-communication endpoints 102 and 104, respectively.

Call manager 112 may be a network server or a switch, arranged to send and receive IP datagrams via packet-switched network 110. Call manager 112 provides a routing engine to allow users to access the various components of the conferencing system. User requests for conferencing services are routed within network 110 to call manager 112. Users may then be forwarded by call manager 112 to video conference bridge 114. Call manager 112 may include a network interface, such as an Ethernet adapter, a processor, and data storage containing program instructions to carry out the call management functions described herein. For example, call manager 112 may contain instructions to conduct video conference call control functions in accordance with the present invention.

VCB 114 is identified by a corresponding bridge address and supplies a plurality of ports at that bridge address for handling respective user connections. VCB 114 may include a controller and a data process for handling signaling and data streams, respectively. In an exemplary embodiment, control signaling is handled via the SIP protocol and media transport is handled using the RTP protocol.

Figure 2:
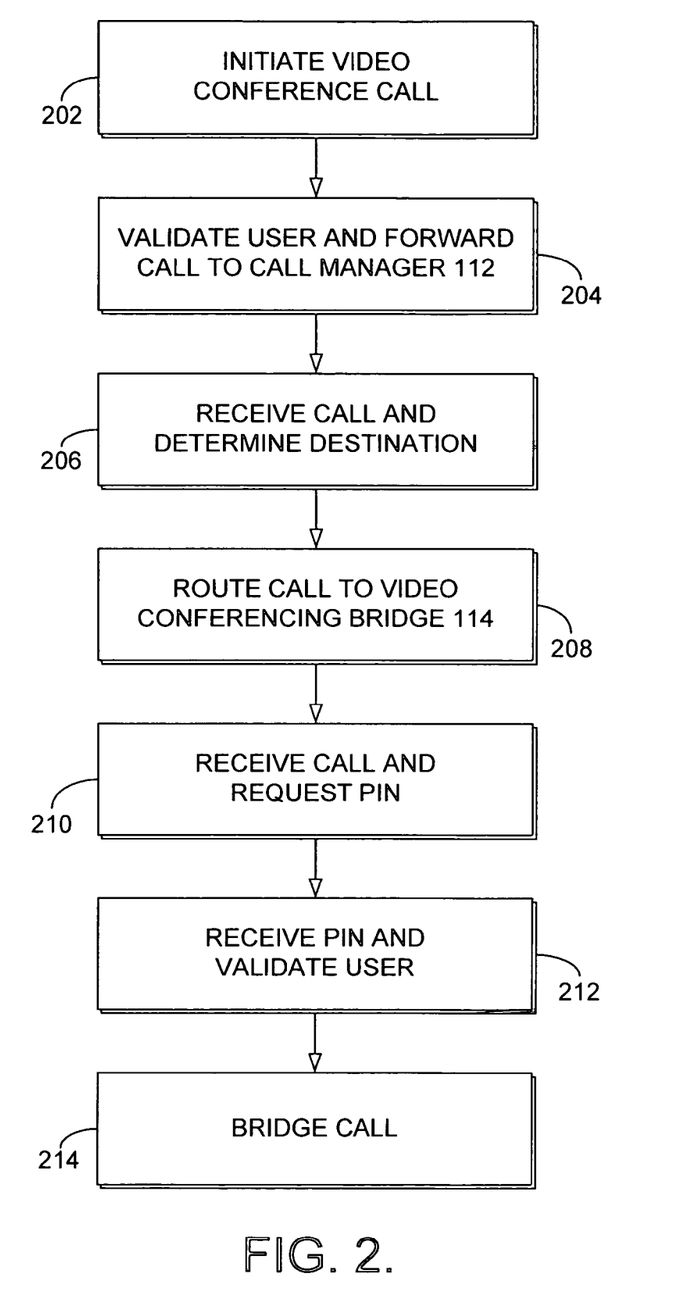
FIG. 2 is a flowchart of an exemplary embodiment of the present invention, carried out by the communications system of FIG. 1.

The process through which a user may participate in a video conference session according to one embodiment of the invention is described with reference to FIG. 2. The process may begin at step 202 when the user of video-communication endpoint 102 initiates a call to participate in a video conference. The user may initiate the call by dialing a number or code using video-communication endpoint 102. For example, video-communication endpoint 102 may be a videophone, and the user may dial a destination phone number by entering the number on the keypad of the user's videophone.

The call from video-communication endpoint 102 may be a SIP-based call. The SIP message may contain information for routing the call and initiating the video conference session. The information may include the telephone number or IP address of the user, the telephone number or IP address of the call's destination, available bandwidth, and the type of call (i.e. video conference). At step 204, SBC 106 receives the call from video-communication endpoint 102. SBC 106 validates the user and forwards the call to call manager 112.

As shown at step 206, call manager 112 receives the call and looks at the information contained within the SIP message to determine where to route the call. Call manager 112 may route the call based on the destination telephone number dialed by the user. Alternatively, call manager 112 may route the call based on other criteria, such as the user's telephone number, the user's IP address, the destination's IP address, or any other unique number or code. Based on the unique number or code, call manager 112 routes the call to VCB 114, as shown at step 208.

VCB 114 receives the call from call manager 112 as shown at step 210. Access to the video conference session may optionally require the user to provide a predetermined code, such as a PIN or password. If such a code is required, VCB 114 requests the user to enter the code. At step 212, VCB 114 receives the predetermined code from the user, examines the code, and validates that the user is authorized to participate in the session. Alternatively, the request and validation of a predetermined code for access to a video conference may be performed by call manager 112 prior to forwarding the call to VCB 114. In addition, the user may have input the code when dialing the call, such that the initial call contained the predetermined code.

If the user is authorized (i.e. the user provides the predetermined code), at step 214, VCB 114 opens a path for communication among video-communication endpoint 102 and other users who have also dialed into the video conference session, including a television-service subscriber, such as one using television host device 122. VCB 114 bridges the calls by multicasting audio and video streams from each of the users to the other users in the video conference session.

Figure 3:
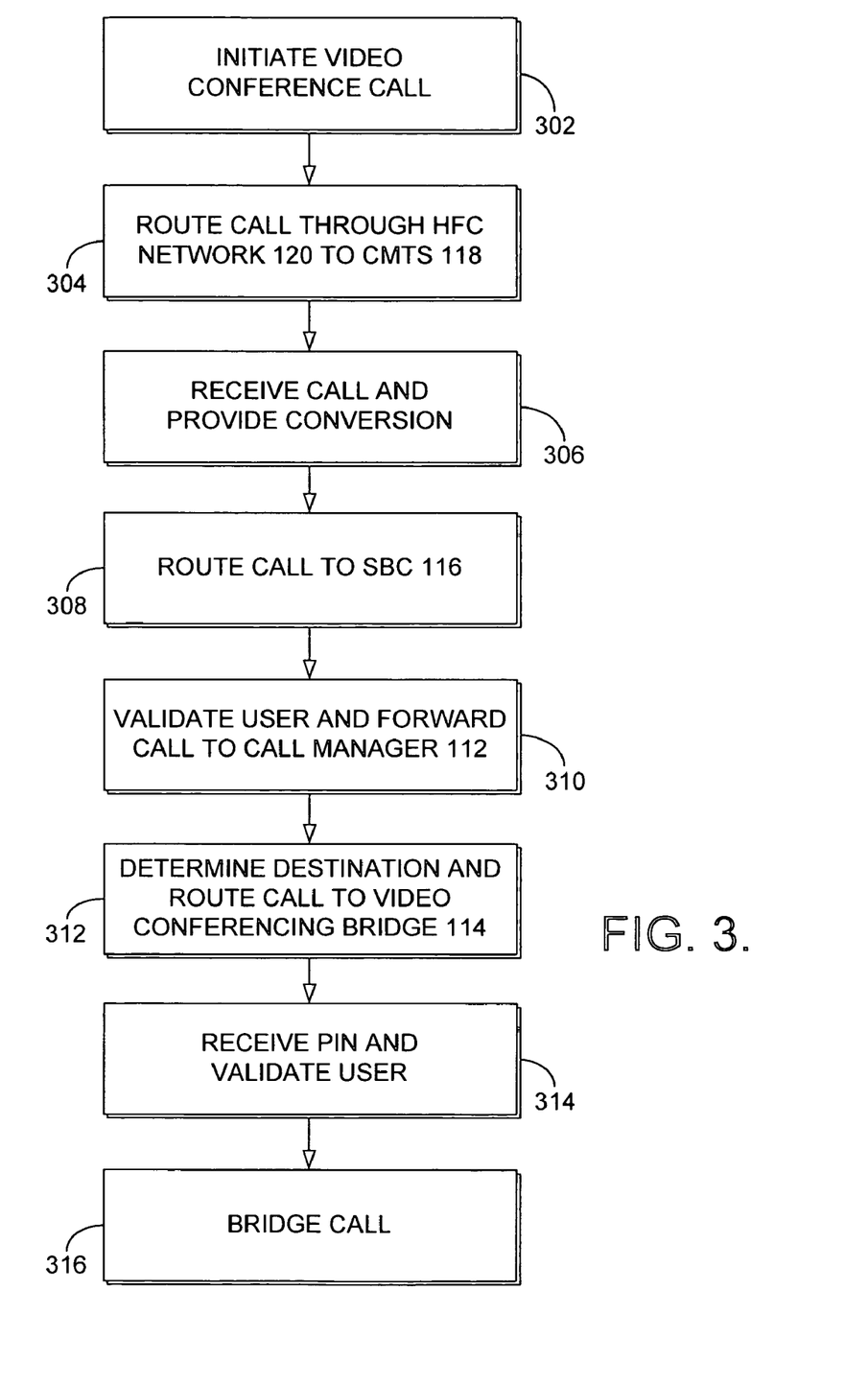
FIG. 3 is a flowchart of an exemplary embodiment of the present invention, carried out by the communications system of FIG. 1.

In an embodiment of the invention, a television-service subscriber may participate in a video conference session using television host device 122. As depicted in the flowchart of FIG. 3, the process may begin when the television-service subscriber initiates a call to participate in a video conference session, as shown at step 302. Television host device 122 may have an electronic programming guide for access to services, such as video conferencing. Using a device such as a remote control, the subscriber may invoke the guide, which displays available services on television device 124. The subscriber selects the video conferencing service and may be required to input a unique number or code, such as a destination phone number or IP address, for routing the call.

Television host device may also be equipped with a SIP client. Based on the subscriber's selection, the client generates a SIP message that contains information such as a phone number or IP address associated with the subscriber, a phone number or IP address associated with the destination of the call, available bandwidth, and the type of call being made.

As shown at step 304, the call is sent from television host device 122 through HFC network 120 to headend/CMTS 118. At step 306, headend/CMTS 118 receives the call and provides conversion between HFC network 118 and packet-switched network 110. Headend/CMTS 118 then routes the call to SBC 116, as shown at step 308. The remaining steps are similar to the process described above in connection with FIG. 2. At step 310, SBC 116 validates the user and forwards the call to call manager 112. At step 312, call manager receives the call, determines the destination based on a unique number or code, and routes the call to VCB 114. VCB 114 may require a predetermined code from the television-service subscriber for access to the session. At step 314, VCB 114 receives the predetermined code and validates the user. Finally, as shown at step 316, VCB 114 opens a communication path between television host device and other users, such as video-communication endpoints 102 and 104.

As can be seen, the present invention and its equivalents are well-adapted to provide a new and useful system and method for providing video conferencing services to television-service subscribers. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for enabling a television-service subscriber to participate in a video-communication session, the method comprising:
   receiving a command in a television host device to participate in a video-communication session; and
   based on the command, transmitting a request through a television-service-provider network to a first network entity, said first network entity being operable to receive a plurality of requests to participate in a video-communication session from a plurality of video-communication endpoints, wherein at least one of the video-communication endpoints is the television host device communicating through a television-service-provider network and at least one of the video-communication endpoints communicates through a video-conference-service-provider network separate from the television-service-provider network, wherein the first network entity forwards the request to a second network entity, and wherein the request causes the second network entity to establish a video-communication session between the television host device and at least one video-communication endpoint communicating via the video-conference-provider network separate from the television-service-provider network.

2. The method of claim 1, wherein the television host device is a television set-top box, a cable-ready television, or a combination thereof.

3. The method of claim 1, wherein the request includes a unique code for routing the request.

4. The method of claim 3, wherein the unique code is a phone number, an IP address, or a combination thereof.

5. The method of claim 1, wherein the request includes a predetermined code for authorizing the television host device to participate in the video-communication session.

6. The method of claim 5, wherein the predetermined code is a personal identification number, a password, or a combination thereof.

7. The method of claim 1, wherein the request conforms to Session Initiation Protocol.

8. The method of claim 1, wherein the television-service-provider network is a cable-television-service-provider network, a satellite-television-service-provider network, or a combination thereof.

9. The method of claim 1, wherein the first and second network entity is located on the television-service-provider network, the video-conference-service provider network, a packet-switched network, or a combination thereof.

10. The method of claim 1, wherein each video-communication endpoint is a video phone, a television host device, or a combination thereof.

11. A method for establishing a video-communication session comprising:
   receiving at a first network entity, a plurality of requests to participate in a video-communication session from a plurality of video-communication endpoints, wherein at least one of the video-communication endpoints is a television host device communicating through a television-service-provider network and at least one of the video-communication endpoints communicates through a video-conference-service-provider network separate from the television-service-provider network;
   routing the plurality of requests to a second network entity, wherein the plurality of requests routed comprise at least one request communicated through the television-service-provider network and at least one request communicated through the video-conference-service-provider network; and
   based on the requests, establishing a video-communication session among the video-communication endpoints.

12. The method of claim 11, wherein at least one request conforms to Session Initiation Protocol.

13. The method of claim 11, wherein each request includes a unique code for routing the request.

14. The method of claim 13, wherein the unique code is a phone number, an IP address, or a combination thereof.

15. The method of claim 11, wherein at least one request includes a predetermined code for authorizing the associated video-communication endpoint to participate in the video-communication session.

16. The method of claim 15, wherein the predetermined code is a personal identification number, a password, or a combination thereof.

17. The method of claim 11, wherein the television host device is a television set-top box, a cable-ready television, or a combination thereof.

18. The method of claim 11, wherein the television-service-provider network is a cable-television-service-provider network, a satellite-television-service-provider network, or a combination thereof.

19. The method of claim 11, further comprising
   requesting a predetermined code from at least one video-communication endpoint;
   receiving the predetermined code from the video-communication endpoint; and
   validating the predetermined code to authorize the video-communication endpoint to participate in the video-communication session.

20. The method of claim 19, wherein the predetermined code is a personal identification number, a password, or a combination thereof.

21. A computer-storage medium having computer-useable instructions embodied thereon for performing a method comprising:
   receiving a command in a television host device to participate in a video-communication session;
   based on the command, transmitting a request through a television-service-provider network to a first network entity, wherein the request includes a unique code for routing the request to the first network entity, said first network entity receiving a plurality of requests to participate in a video-communication session from a plurality of video-communication endpoints, wherein at least one of the video-communication endpoints is the television host device communicating through a television-service-provider network and at least one of the video-communication endpoints communicates through a video-conference-service-provider network separate from the television-service-provider network; wherein the first network entity routes the request to a second network entity, wherein the second network entity authorizes a user and opens a communication path between the video communication endpoints, to establish a video-communication session between the television host device and at least one video-communication endpoint communicating via the video-conference-service-provider network separate from the television-service-provider network.

22. The medium of claim 21, wherein the television host device is a television set-top box, a cable-ready television, or a combination thereof.

23. The medium of claim 21, wherein the unique code is a phone number, an IP address, or a combination thereof.

24. The medium of claim 21, wherein the request includes a predetermined code for authorizing the television host device to participate in the video-communication session.

25. The medium of claim 24, wherein the predetermined code is a personal identification number, a password, or a combination thereof.

26. The medium of claim 21, wherein the request conforms to Session Initiation Protocol.

27. The medium of claim 21, wherein the television-service-provider network is a cable-television-service-provider network, a satellite-television-service-provider network, or a combination thereof.

28. The medium of claim 21, wherein the first and second network entity is located on the television-service-provider network, the video-conference-service provider network, a packet-switched network, or a combination thereof.

29. The medium of claim 21, wherein each video-communication endpoint is a video phone, a television host device, or a combination thereof.

30. A computer-storage medium having computer-useable instructions embodied thereon for performing a method comprising:
   receiving at a first network entity, a plurality of requests to participate in a video-communication session from a plurality of video-communication endpoints, wherein each request includes a unique code for routing the request and at least one of the video-communication endpoints is a television host device communicating through a television-service-provider network and at least one of the video-communication endpoints communicates through a video-conference-service-provider network separate from the television-service-provider network; and
   routing the plurality of requests to a second network entity, wherein the plurality of requests routed comprise at least one request communicated through the television-service-provider network and at least one request communicated through the video-conference-service-provider network, wherein the second network entity establishes a video-communication session among the video-communication endpoints.

31. The medium of claim 30, wherein at least one request conforms to Session Initiation Protocol.

32. The medium of claim 30, wherein the unique code is a phone number, an IP address, or a combination thereof.

33. The medium of claim 30, wherein each request includes a predetermined code for authorizing the associated video-communication endpoint to participate in the video-communication session.

34. The medium of claim 33, wherein the predetermined code is a personal identification number, a password, or a combination thereof.

35. The medium of claim 30, wherein the television host device is a television set-top box, a cable-ready television, or a combination thereof.

36. The medium of claim 30, wherein the television-service-provider network is a cable-television-service-provider network, a satellite-television-service-provider network, or a combination thereof.

37. The medium of claim 30, further comprising:
   requesting a predetermined code from at least one video-communication endpoint;
   receiving the predetermined code from the video-communication endpoint; and
   validating the predetermined code to authorize the video-communication endpoint to participate in the video-communication session.

38. The medium of claim 37, wherein the predetermined code is a personal identification number, a password, or a combination thereof.

39. A system to enable a television host device to participate in a video-communication session comprising:
   a video-conference-service-provider network;
   a video-communication endpoint operative to transmit and receive data via the video-conference-service-provider network;
   a television-service-provider network communicatively coupled with the video-conference-service-provider network;
   a television host device operative to transmit and receive data via the television-service provider network;
   a call manager located on at least one of the video-conference-service-provider network and the television-service-provider network, the call manager being operative to route, from the television host device communicating through the television-service-provider network to a video conferencing bridge, a first request to participate in a video-communication session, and to route, from the video-communication endpoint communicating through the video-conference-service provider network to a video conferencing bridge, a second request to participate in the video-communication session;
   a video conferencing bridge located on at least one of the video-conference-service-provider network and the television-service-provider network, the video conferencing bridge being operative to establish a video communication path between the television host device and the video-communication endpoint.

40. The system of claim 39, wherein the television host device is a television set-top box, a cable-ready television, or a combination thereof.

* * * * *

UNITED STATES PATENT AND TRADEMARK OFFICE
CERTIFICATE OF CORRECTION

PATENT NO.         : 7,573,498 B1
APPLICATION NO. : 11/001472
DATED                  : August 11, 2009
INVENTOR(S)       : Dhanoa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Fourteenth Day of December, 2010

David J. Kappos
*Director of the United States Patent and Trademark Office*